United States Patent [19]

Nishii

[11] Patent Number: 5,202,915
[45] Date of Patent: Apr. 13, 1993

[54] SINGLE LINE COMMUNICATION APPARATUS FOR SPEECH AND DATA AND METHOD THEREFOR

[75] Inventor: Teruyuki Nishii, Yokohama, Japan

[73] Assignee: Canon Kabushiki Kaisha, Tokyo, Japan

[21] Appl. No.: 915,890

[22] Filed: Jul. 20, 1992

Related U.S. Application Data

[63] Continuation of Ser. No. 715,720, Jun. 18, 1991, abandoned, which is a continuation of Ser. No. 372,622, Jun. 28, 1989, abandoned.

[30] Foreign Application Priority Data

Jul. 1, 1988 [JP] Japan ................................ 63-165651

[51] Int. Cl.$^5$ ................................................ H04M 11/00
[52] U.S. Cl. ................................ 379/100; 379/105; 379/98
[58] Field of Search ............... 379/100, 96, 98, 93, 379/105; 358/400, 434, 442, 437

[56] References Cited

U.S. PATENT DOCUMENTS

| | | |
|---|---|---|
| 4,353,097 | 10/1982 | Takeda et al. |
| 4,367,374 | 1/1983 | Serrano ................................ 379/93 |
| 4,596,021 | 6/1986 | Carter et al. ........................ 379/98 X |
| 4,677,660 | 6/1987 | Yoshida. |
| 4,736,249 | 4/1988 | Iizuka et al. ........................ 358/442 |
| 4,773,080 | 9/1988 | Nakajima et al. |
| 4,800,439 | 1/1989 | Yoshino. |
| 4,811,385 | 3/1989 | Watanabe ............................ 379/100 |
| 4,815,121 | 3/1989 | Yoshida. |
| 4,837,806 | 6/1989 | Watanabe ............................ 379/100 |
| 4,850,008 | 7/1989 | Berg et al. .......................... 379/100 |
| 4,901,343 | 2/1990 | Yamaguchi ........................ 358/400 |
| 4,908,851 | 3/1990 | Kotani et al. ...................... 379/96 |
| 4,910,610 | 3/1990 | Utsugi ................................ 358/434 |
| 4,974,253 | 11/1990 | Hashimoto ........................ 379/100 |

OTHER PUBLICATIONS

Operating Instructions for Panasonic KX-F120 Telephone-Answering System with Facsimile, Jan. 1989.
Epson Specification for Priority Fax 1000, 1989.

*Primary Examiner*—James L. Dwyer
*Assistant Examiner*—Ahmad F. Matar
*Attorney, Agent, or Firm*—Fitzpatrick, Cella, Harper & Scinto

[57] ABSTRACT

In a single line communication apparatus for both telephone and data (e.g., facsimile), the communication line is switched from a telephone to a data communication unit when an incoming data call is received in response to an indication for data communication from the telephone. The communication line is monitored to detect the occurrence of a non-aural terminal calling tone (CNG) within a predetermined time period. Upon detection of the CNG tone within the predetermined time period, a non-aural called party discrimination signal (CED) is transmitted to indicate the start of a data communication.

14 Claims, 2 Drawing Sheets

SINGLE LINE COMMUNICATION APPARATUS FOR SPEECH AND DATA AND METHOD THEREFOR

This application is a continuation of application Ser. No. 07/715,720 filed Jun. 18, 1991, which is a continuation of application Ser. No. 07/372,622, filed Jun. 28, 1989 now both abandoned.

BACKGROUND OF THE INVENTION

1. Field of the Invention:

The present invention relates to a data communication apparatus with a remote control function of the type which employs a single communication line for both conversation and data communication, as well as a communication method therefor.

2. Description of the Related Art:

In an apparatus of the type in which a single communication line is used with, for example, a telephone set and a facsimile machine, the facsimile machine is normally set in manual reception mode. Once there is an incoming call, the operator takes the call by picking up the handset of the telephone set. If the remote party is a person, he or she talks over the telephone. If the remote party is a facsimile, the operator activates the facsimile machine by pressing a start key on an operator panel. Alternatively, if the telephone set is placed in a place separate from the facsimile machine, the operator activates the facsimile machine for facsimile communication by performing remote control of the facsimile machine, e.g., by hooking the telephone set, dialing a special number or by hanging up the telephone.

However, in a case where the facsimile machine placed in a place separate from the telephone set is remotely controlled by the hooking of the telephone set, the possibility of the facsimile machine mulfunctioning due to operation errors is high unless a dedicated key is provided. In a case where the remote facsimile machine is activated by dialing a special number using the telephone set, both the pulse method and tone method are employed depending on the communicating line connected, requiring a large amount of hardware and increasing the space required for installation and the cost. In the case of the activation of the distant facsimile machine by the hanging up of the telephone, connection of the line is switched over by returning the handset to its rest, and it is therefore difficult to confirm the connection.

After the connection of the communication line has been switched over by either of the above-described methods, a facsimile procedure signal is sent out to the remote party and the response of the remote party is then awaited. In consequence, if the communication line is, for example, disconnected by the remote party before the communication starts, the telephone set or the facsimile machine cannot be used for a certain period of time (which is equivalent to T1 time of CCITT T.30) in spite of the fact that the line is disconnected.

SUMMARY OF THE INVENTION

In view of the above-described problem of the prior art, an object of the present invention is to provide a data communication apparatus and a communication method therefor which are capable of informing the normal connection of a communication line by determining whether or not a signal indicating that a remote party is a data communication terminal is received within a predetermined period of time after remote control and by monitoring in response to the detection a signal to be transmitted by a base apparatus in connection with the data communication.

Other objects of the present invention will become clear from the foregoing description taken in conjunction with the accompanying drawings.

DETAILED DESCRIPTION OF THE PREFERRED EMBODIMENT

An embodiment of the present invention will now be described with reference to the accompanying drawings.

Figure 1:
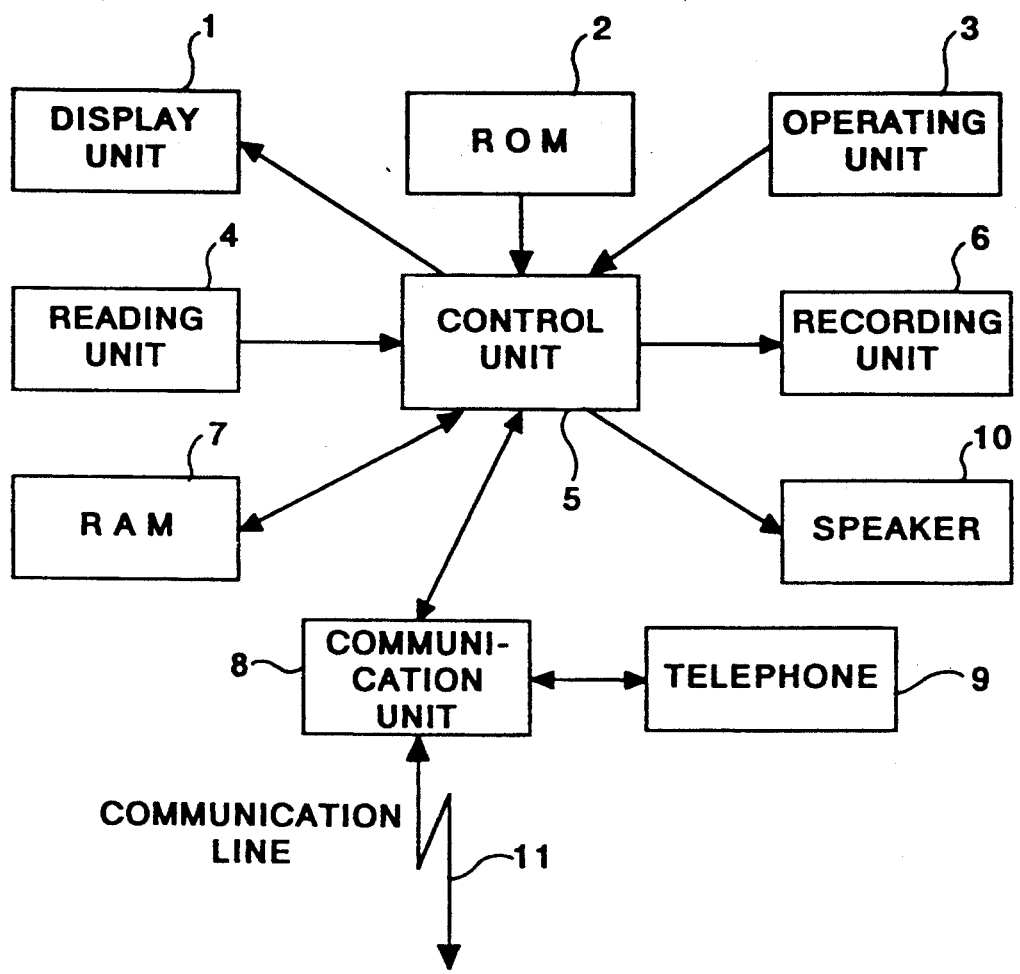
FIG. 1 is a block diagram of a facsimile machine, showing an embodiment of the present invention.

FIG. 1 is a block diagram of a facsimile machine in this embodiment. The facsimile machine includes a control unit 5 constituted by a microprocessor element, a peripheral circuit thereof and so on, the control unit 5 performing the control of the overall machine in accordance with the processings (programs) stored in a ROM 2 which will be described later, a ROM 2 for storing the processings (shown in FIG. 2) executed by the control unit 5, a control table and so on, a RAM 7 containing a buffer for temporarily storing data read by a reading unit 4 and data received by a communication unit 8, the reading unit 4 and the communication unit 8 being described later, as well as a work area used when the processings are executed by the control unit 5, and a reading unit 4 which may be a CCD image sensor with 2048 pixels, the reading unit 4 reading an original to be transmitted by means of an electrical scanning.

The facsimile machine also includes a recording unit 6 for printing out an image data received or the like, an operating unit 3 constituted by ten keys used to input the number of a remote facsimile, a start key and so on, a display unit 1 constituted by a liquid crystal display (LCD) for monitoring the operation input by the operating unit 3 or the state of the machine, an LCD driver circuit and so on, and a communication unit 8 constructed by a communication control unit for performing the control of communication of control signals or image data in accordance with the transmission control procedure of a facsimile which will be described later, a switch-over circuit for switching over the connection of a communication line 11 between a telephone set 9 and the facsimile machine, a MODEM, a network control circuit (NCU) and so on.

The facsimile machine further includes a speaker 10. In this embodiment, when an incoming call from a remote facsimile machine is detected, the connection of the communication line 11 is switched over so that the line is connected to the facsimile machine, and a signal to be transmitted by the base facsimile machine is then output to and monitored by the speaker 10 to inform the operation of the start of a facsimile communication.

The above-described transmission control procedure includes tonal signaling for an analog facsimile procedure, and binary coded signaling for a digital facsimile procedure. Both procedures are standardized in T.30 recommended by CCITT. The present embodiment will be described on the basis of the binary coded signaling for a digital facsimile procedure.

Next, the operation of the facsimile machine in this embodiment will be described below.

When there is an incoming call to a facsimile machine which has been set in manual reception mode, an operator takes up a handset of the ringing telephone 9. If it is a facsimile that is calling, a CNG signal (a calling tone indicating a non-aural terminal) is heard by the operator. In that case, the operator switches over the connection of the communication line 11 so that the line is connected to the facsimile by remote control, e.g., by hooking the telephone set, by dialing a special number or by hanging up. After the switch-over has been completed, the facsimile machine sends out a CED signal (a called party discrimination signal representing a non-aural terminal), and starts reception of image data in accordance with the transmission control procedure (binary coded signaling).

A CNG signal is heard upon the removal of the handset only when the remote party is set in the automatic transmission mode. In the case of the transmission performed with the remote party set in manual transmission mode, the operator talks over the telephone 9, and then connects the communication line 11 to the facsimile machine to start the facsimile communication.

Thereafter, the communication unit 8 starts communication in accordance with the above-described transmission control procedure. First, it transmits a DIS signal (a digital signal which indicates that the receiving machine is ready to operate) to a transmitting machine. Then, it receives from the transmitting side a DCS signal (a digital instruction signal) which designates the communication mode, a training signal, and a TCF signal (a training checking signal). Upon receipt of these signals, the receiving machine fixes the communication mode in a mode designated by the DCS signal, and confirms communication in the designated communication mode using the training signal and the TCF signal. Once these operations have been completed, the receiving machine sends out to the transmitting side a CFR signal (a signal representing that preparation of reception has been completed). Then, the receiving machine receives from the transmitting side an image signal and then an EOM signal (a signal indicating the completion of transmission of a message). Upon receipt of the EOM signal, the receiving side transmits an MCF signal (a signal confirming the receipt of the message). In response to it, the receiving side receives an EOP signal (a signal representing that a sequence of communication procedures has been completed). Upon receipt of it the communication line 11 is connected to the telephone set 9, and another call is awaited.

During the above-described reception operation, the display unit 1 displays "receiving". Once the communication unit 8 has completed the reception of image data, MH or MR coded image data is decoded, and the decoded data is printed out by the recording unit 6. In the case of the transmission of an image, the reading unit 4 reads an original, the resultant coded image data being output. During this transmission operation, the display unit 1 displays "transmitting".

Figure 2:
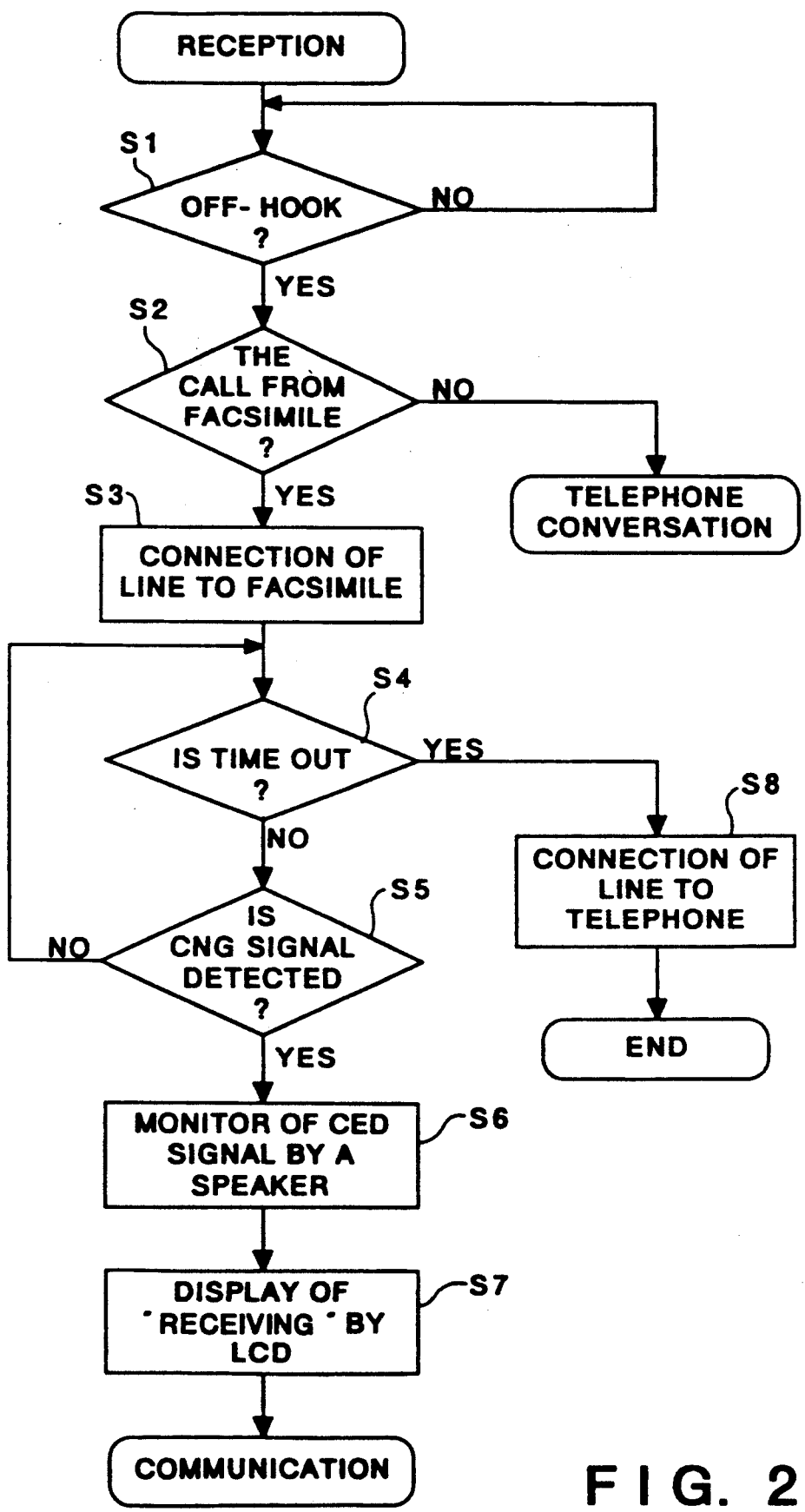
FIG. 2 is a flowchart illustrating the processings performed in the embodiment according to the present invention.

Next, the processings performed by the control unit 5 in this embodiment will be described with reference to the flowchart of FIG. 2.

When there is an incoming call to the facsimile machine which is set in manual reception mode, it is determined in step S1 whether or not an operator has picked up the handset of the telephone set 9. Once the off-hook of the telephone set 9 has been detected through the communication unit 8, it is determined in step 2 whether or not this call is coming from a facsimile. Whether or not the call is from a facsimile is determined by the input of the remote control which is performed by the operator. If the answer is negative, i.e., if the call is not from a facsimile, messages are verbally exchanged over the telephone. If it is determined that the call is coming from a facsimile, the process goes to step S3, where an instruction to connect the communication line 11 to the facsimile machine is output to the communication unit 8.

Next, in steps S4 and S5, determination is made as to whether or not a CNG signal has been received from the remote party during the period between the connection of the communication line 11 from the telephone set 9 to the facsimile machine which is performed by the communication unit 8 and the transmission of a CED signal. If no signal is detected, the process proceeds to step S8 where the communication line 11 is connected to the telephone set 9 and the processing then ends. If a CNG signal is detected by the time a CED signal is transmitted by the communication unit 8, the CED signal is output to the speaker 10 as a confirmation signal in step S6 so as to inform the operator that the processing proceeds to facsimile communication. Next, in step S7, a message, such as "receiving", is displayed by the LCD, and then the facsimile communication is started.

In this embodiment, the speaker 10 incorporated in the facsimile machine monitors the CED signal so as to make the operator confirm that the processing proceeds to facsimile communication. However, in a case where the telephone set 9 is disposed apart from the facsimile machine, e.g., in a case where they are in different rooms or on different floors, the operator can be informed of the start of the facsimile communication either by a beeper or verbally, e.g., with a message such as "facsimile communication will now start", by means of an audio response function incorporated in the handset of the telephone 9. In a case where the handset has already been put back, the same effect may be obtained by ringing the telephone once.

In this embodiment, determination is made as to whether or not a CNG signal has been received from the remote facsimile during the period between the connection of the communication line to the facsimile machine and the transmission of a CED signal which is a called party discrimination signal. In consequence, even if the line is disconnected by the remote machine before communication starts, connection of the communication line can be switched over so that the telephone set is connected to the line without delay. Furthermore, if the remote machine is a telephone, verbal messages are exchanged over the telephone, and then connection of the communication line is switched over by remote control so as to start facsimile communication.

As will be understood from the foregoing description, if no CNG signal to be received from the remote machine is detected after the communication line has been caught by the facsimile machine by means of the remote control, connection of the communication line is switched over so that the telephone set is connected to the line. In consequence, unnecessary signal transmission and waiting for the reception of a signal can be eliminated, and effective use of the facsimile machine and the telephone set can be made possible.

Furthermore, when facsimile communication starts, the CED signal transmitted by the base facsimile is monitored by the speaker so that the operator can confirm the start of the facsimile communication.

The above-described embodiment employs a facsimile machine. However, the present invention can also be applied to a data communication apparatus which may be a teletex, the communication with a personal computer, or the communication with a word processor.

This invention has been described with reference to the preferred embodiment. Obvious modifications and alterations will occur to others upon reading and understanding of this specification. The intention is to include all such modifications and alterations insofar as they come within the scope of the appended claims or the equivalent thereof.

What is claimed is:

1. A data communication apparatus, in which a remote telephone can be connected and a single communication line is selectively used for speech communication by the telephone and data communication by a data communication means, comprising:

detection mean for detecting a remote indication for starting data communication from the telephone remote from the data communication means;

switch-over means for switching over the communication line from the telephone to the data communication means in response to the remote indication;

control means for detecting reception of a signal related to data communication after the communication line has been switched over to the data communication means by the switch-over means, and for controlling a start of data communication in response to the signal reception detection; and information means for informing an operator at the telephone by a sound that data communication has been started by said control means.

2. A data communication system according to claim 1, wherein said control means switches over the communication line from the data communication means to the telephone when the signal related to data communication has not been received within a predetermined period of time.

3. A data communication system according to claim 1, wherein said control means detects that a signal indicating facsimile communication has been received.

4. A data communication system according to claim 1, wherein said information means also informs of the start of communication from a speaker incorporated in the data communication means.

5. A data communication system according to claim 1, wherein said control means generates a prescribed signal tone which said information means announces to the operator in response to the reception of the signal related to data communication.

6. A data communication method for use in a system in which a single communication line is selectively used for speech communication by a remote telephone and data communication by a data communication means, and the data communication is initiated during speech communication by the telephone, comprising the steps of:

transmitting a remote indication for starting data communication from the telephone to the data communication means, the telephone being remote from the data communication means;

switching over the communication line from the speech communication by the telephone to the data communication by the data communication means in response to the remote indication for data communication;

detecting reception of a signal related to data communication from the communication line;

controlling a start of data communication in response to the signal detection; and informing an operator at the telephone by a sound that data communication has been started.

7. A data communication method according to claim 6, wherein said control step switches over the communication line from the data communication means to the telephone in a case where the signal related to data communication has not been received within a predetermined period of time.

8. A data communication method according to claim 6, wherein said control step detects that a signal indicating facsimile communication has been received.

9. A data communication method according to claim 6, wherein said information step also informs of the start of communication from a speaker incorporated in the data communication means.

10. A data communication according to claim 6, wherein said control step comprises generating a prescribed signal tone which said information step announces to the operator in response to the reception of the signal related to data communication, and informs the start of data communication.

11. A data communication apparatus in which a remote telephone is connected, comprising:

data communication means for data communication, the telephone being remote from said data communication means;

switching means for selectively connecting the telephone or said data communication means with a communication line;

detection means for detecting a remote indication for starting data communication from the telephone;

control means for switching over said switching means from the telephoned to the data communication means in response to the indication, detecting a signal related to data communication from the line, and controlling the start of data communication in response to the detected signal; and information means for informing an operator at the telephone by a sound that the data communication has been started by said control means.

12. A data communication apparatus according to claim 11, wherein said control means switches over the communication line from the data communication means to the telephone when the signal related to data communication has not been received within a predetermined period of time.

13. A data communication apparatus according to claim 11, wherein said control means detects that a signal indicating facsimile communication has been received.

14. A data communication apparatus according to claim 11, wherein said control means generates a prescribed signal tone which said information means announces to the operator in response to the reception of the signal related to data communication.

* * * * *

UNITED STATES PATENT AND TRADEMARK OFFICE
CERTIFICATE OF CORRECTION

PATENT NO. : 5,202,915
DATED : April 13, 1993
INVENTOR(S) : TERUYUKI NISHII

It is certified that error appears in the above-identified patent and that said Letters Patent is hereby corrected as shown below:

COLUMN 5

Line 21, "mean" should read --means--.

COLUMN 6

Line 25, "communication" should read --communication method--.
    Line 42, "telephoned" should read --telephone--.

Signed and Sealed this

Twelfth Day of April, 1994

Attest:

BRUCE LEHMAN

Attesting Officer

*Commissioner of Patents and Trademarks*